United States Patent
Wang et al.

(10) Patent No.: US 9,329,911 B2
(45) Date of Patent: May 3, 2016

(54) DRIVER INITIALIZATION FOR A PROCESS IN USER MODE

(71) Applicant: MStar Semiconductor, Inc., Hsinchu County (TW)

(72) Inventors: Jian Wang, Shanghai (CN); Ming-Yong Sun, Shanghai (CN)

(73) Assignee: MSTAR SEMICONDUCTOR, INC., Hsinchu County (TW)

( * ) Notice: Subject to any disclaimer, the term of this patent is extended or adjusted under 35 U.S.C. 154(b) by 367 days.

(21) Appl. No.: 13/864,456

(22) Filed: Apr. 17, 2013

(65) Prior Publication Data
US 2013/0305259 A1    Nov. 14, 2013

(30) Foreign Application Priority Data

May 9, 2012    (CN) .......................... 2012 1 0143390

(51) Int. Cl.
*G06F 9/52*    (2006.01)
*G06F 9/46*    (2006.01)
*G06F 3/0484*   (2013.01)
*G06F 13/10*    (2006.01)

(52) U.S. Cl.
CPC ................ *G06F 9/526* (2013.01); *G06F 9/461* (2013.01); *G06F 3/0484* (2013.01); *G06F 9/52* (2013.01); *G06F 13/102* (2013.01); *G06F 13/105* (2013.01)

(58) Field of Classification Search
None
See application file for complete search history.

(56) References Cited

U.S. PATENT DOCUMENTS

| | | | | |
|---|---|---|---|---|
| 6,009,476 A | * | 12/1999 | Flory et al. | 719/324 |
| 6,275,857 B1 | * | 8/2001 | McCartney | G06F 9/4843 707/999.202 |
| 7,937,710 B1 | * | 5/2011 | Silkebakken | G06F 9/461 718/100 |
| 8,458,368 B2 | * | 6/2013 | Watkins | G06F 9/5011 710/1 |
| 8,752,057 B1 | * | 6/2014 | Gould et al. | 718/102 |
| 2004/0068607 A1 | * | 4/2004 | Narad | 711/108 |
| 2009/0049451 A1 | * | 2/2009 | Bates | 718/108 |
| 2011/0154368 A1 | * | 6/2011 | Banks et al. | 719/316 |
| 2013/0055284 A1 | * | 2/2013 | Sabato | 718/106 |

FOREIGN PATENT DOCUMENTS

TW    200517865 A    6/2005
TW    200941338 A    10/2009

OTHER PUBLICATIONS

Taiwan Intellectual Property Office, "Office Action", Aug. 12, 2014.

* cited by examiner

*Primary Examiner* — Abdullah Al Kawsar
*Assistant Examiner* — Caroline H Arcos
(74) *Attorney, Agent, or Firm* — WPAT, P.C.; Justin King; Douglas A. Hosack

(57) ABSTRACT

A hardware control method for multitasking drivers under a user mode is provided. The control method includes steps of: receiving a request for access to a hardware device from a current process under the user mode; determining whether the current process has obtained a mutual exclusion (mutex) of the hardware device; if affirmative, determining whether an identification of the current process and an identification of a previous process accessed the hardware device are the same; if negative, performing a context switch on the current process and the previous process accessed the hardware device to allow the current process to access the hardware device. Accordingly, when accessing complicated hardware devices, the disclosure significantly enhances driver performance under a user mode while also implementing secured random access to hardware devices in a multitasking environment.

23 Claims, 8 Drawing Sheets

DRIVER INITIALIZATION FOR A PROCESS IN USER MODE

This application claims the benefit of People's Republic of China application Serial No. 201210143390.9, filed May 9, 2012, the subject matter of which is incorporated herein by reference.

BACKGROUND OF THE INVENTION

1. Field of the Invention

The invention relates in general to a computer field, and more particularly to a hardware control method and apparatus for multitasking drivers under a user mode.

2. Description of the Related Art

In a Unix system such as Linux, programs including device drivers can be operated under two modes—a user mode and a kernel mode. System resources provided in the two modes are quite different.

A program operating under the user mode has restricted access to only a part of system sources, and is incapable of directly accessing kernel data structures to directly interact with kernel programs. This is one of the primary benefits of running a driver in user mode; there is improved stability, since a user mode device driver cannot crash the system by overwriting kernel memory.

Taking a 32-bit central processing unit (CPU) for example, a program operating under the kernel mode can execute any CPU command, access any location of a 4 G memory space, and directly access desired core data structures or programs.

A driver is a storage area that is system file formatted and carries a drive code. In an overall control link, a driver is a middle link located between a main controller and a motor. A main function of a driver is to receive a signal from the main controller, process the signal and transmit the processed signal to the motor and a sensor associated with the motor, and feed an operation condition of the motor back to the main controller.

To share hardware devices and data under a multitasking environment, a mainstream Linux driver operates under a kernel mode. However, several drawbacks are incurred.

First of all, it is difficult to evade from General Public License (GPL) restrictions, since the driver is included in the Linux kernel. Once being enveloped by the GPL, it is mandatory that the driver make its source code public, and such requirement is quite unacceptable in commercial applications which rely on keeping proprietary information secret.

Secondly, as applications need to frequently enter and exit the kernel mode, extensive system loadings may be incurred by certain hardware devices with complicated functionalities such as a graphic processing display, such that overall system performance is degraded.

Thirdly, when access congestion occurs in one program of a driver operating under the kernel mode, congestion in operations of the entire system often results even if the access congestion is caused by only one faulty process. In contrast, under the user mode, when access congestion occurs in one program of a driver, congestion only results in a process utilizing the program instead of affecting the entire system and other processes.

Moreover, under the kernel mode, adjustments to hardware devices cannot be made easily, and such a problem is even more severe in situations where registers of hardware devices are frequently accessed.

Some drivers based on the user mode are currently available. However, these drivers can only be applied to simple hardware devices, and still fall short in providing applications with secured random access to hardware devices in a multitasking environment.

SUMMARY OF THE DISCLOSURE

The disclosure is directed to a hardware control method and apparatus for multitasking drivers under a user mode. The hardware control method and apparatus is capable of significantly enhancing driver performance when accessing a complicated hardware device as well as implementing secured random access to hardware devices in a multitasking environment.

According to an aspect of the disclosure, a hardware control method for multitasking drivers under a user mode is provided. The hardware control method includes steps of: receiving a request for access to a hardware device from a first process under the user mode, wherein the request includes a first identification corresponding to the first process; determining whether the first process has obtained a mutual exclusion (mutex) of the hardware device; when the first process has obtained the mutex, determining whether the first identification and a second identification corresponding to a second process previously accessed the hardware device are the same; and when the first identification and the second identification are different, performing a context switch on the first process and the second process to allow the first process to access the hardware device.

The hardware control method further includes: reading a register and/or an I/O status data from a stored process image file, and writing the read register and/or I/O status data to the hardware device to restore the hardware device to a configuration corresponding to the first process.

The process image file is a program image file of a driver under the user mode, is for recording the register and/or the I/O status data, and is data exclusive to a corresponding process.

The hardware control method further includes: when the first process has obtained the mutex, determining whether the identification of a first thread and an identification of a second thread having obtained the mutex are the same, wherein the first thread corresponds to the first process, and the second thread corresponds to the second process; when the identification of the first thread and the identification of the second thread are the same, adding a value of a mutex counter by 1, and the first thread continuing utilizing the hardware device; and when the identification of the first thread and the identification of the second thread are different, the first thread waiting until the mutex is obtained.

When the first identification and the second identification are the same, the first process continues utilizing the hardware device.

The hardware control method further includes: determining whether the value of the mutex counter is greater than or equal to 1. When the value of the mutex counter is greater than or equal to 1, it means that the first process has obtained the mutex; when the value of the mutex counter is smaller than 1, it means that the first process has not yet obtained the mutex.

The hardware control method further includes: after the first process finishes accessing the hardware device, determining whether the value of the mutex counter is greater than or equal to 1; releasing the mutex and exiting a utilization state of the hardware device when the value of the mutex counter is smaller than 1; and subtracting the value of the mutex counter by 1 when the value of the mutex counter is greater than or equal to 1.

The first process utilizes the hardware device via at least one application programming interface (API).

The hardware control method further includes: determining whether the request is a request for a resource exclusive mode; when the request is the request for the resource exclusive mode, obtaining the mutex of the hardware device by a start API under the resource exclusive mode, and the first process continuing utilizing the hardware device until all operations of the first process are completed; and when all the operations of the first process are completed, releasing the mutex and exiting an in-use status of the hardware device.

The hardware control method further includes: registering a program process termination function of the first process. The program process termination function recycles all information of the first process and restores a status of the hardware device.

The hardware control method further includes: determining whether the first process is utilizing the hardware device; releasing the hardware device when the first process is utilizing the hardware device; determining whether the value of the mutex counter of the first process is greater than or equal to 1 when the first process is not utilizing the hardware device; releasing the mutex, resetting the value of the mutex to 0, and exiting the first process when the value of the mutex counter is greater than or equal to 1.

The hardware control method further includes performing driver initialization for the first process.

The hardware control method further includes: determining whether the first process is a first process that requests for access to the hardware device; when the first process is the first process that requests for access to the hardware device, the first process establishing the mutex according to a thread mutually exclusive access and a shared image file; when the first process is not the first process that requests for access to the hardware device, the first process obtaining the established mutex and the shared image file.

The shared process image file is a program image file of the driver under the user mode, is for recording the register and/or the I/O status data, and is data shared by all processes.

According to another aspect of the disclosure, a hardware control apparatus is provided. The hardware control apparatus, for controlling a hardware device in a multitasking user mode, includes: a receiving module, for receiving a request for access to the hardware device from a first process under the user mode, wherein the request includes a first identification corresponding to the first process; a first determination module, for determining whether the first process has obtained a mutex for permitting access to the hardware device; a second determination module, for determining whether the first identification of the first process and a second identification corresponding to a second process that previously accessed the hardware device are the same when the first process has obtained the mutex; and a switch and access module, for performing a context switch on the first process and the second process when the first identification and the second identification are different, to allow the first process to access the hardware device.

The switch and access module reads a register and/or I/O status data from a stored image file of the first process, and writes the read register and/or I/O status data to the hardware device to restore the hardware device to a configuration of the first process.

The image file of the first process is a process image file of a driver under the user mode. The image file is for recording the register and/or I/O status data, and is exclusive data of the corresponding process.

The hardware control apparatus further includes: a third determination module, for determining whether an identification of a first thread and an identification of a second thread having obtained the mutex are the same when the first process has obtained the mutex, wherein the first thread corresponds to the first process and the second thread corresponds to the second process; and a first execution module, for adding the value of the mutex counter by 1 when the identification of the first thread and the identification of the second thread are the same to allow the first thread to continue utilizing the hardware device, and prompting the first thread to wait until the mutex is obtained when the identification of the first thread and the identification of the second thread are different.

The hardware control apparatus further includes: a second execution module, for allowing the first process to continue utilizing the hardware device when the identification of the first thread and the identification of the second thread are the same.

The first determination module includes: a first determination unit, for determining whether the value of the mutex counter of the first process is greater than or equal to 1; and a mutex unit, for indicating that the first process has obtained the mutex when the value of the mutex counter is greater than or equal to 1, and indicating that the first process has not yet obtained the mutex when the value of the mutex counter is smaller than 1.

The hardware control apparatus further includes: a fourth determination module, for determining whether the value of the mutex counter is smaller than 1 when the first process finishes accessing the hardware device; and a third execution module, for releasing the mutex and exiting the in-use status of the hardware device when the value of the mutex counter is smaller than 1, and subtracting the value of the mutex counter by 1 when the value of the mutex counter is greater than or equal to 1. Further details of this fourth determination module are provided below.

The first process utilizes the hardware device via at least one API.

The hardware control apparatus further includes a resource exclusivity module. The resource exclusivity module includes: a hardware exclusivity unit, for determining whether the request is a request for a resource exclusive mode, wherein an initial API under the resource exclusive mode obtains the mutex of the hardware device, and the first process continues utilizing the hardware device until the first process completes all operations; and a hardware exit unit, for releasing the mutex and exiting the in-use status of the hardware device after the first process completes all the operations.

The hardware control apparatus further includes a program process termination function module for recycling all information of the first process and restoring the status of the hardware device. The program process termination function module includes: a second determination unit, for determining whether the first process is utilizing the hardware device; a hardware release unit, for releasing the hardware device when the first process is utilizing the hardware device; a third determination unit, for determining whether the value of the mutex counter is greater than or equal to 1 when the first process is not utilizing the hardware device; and a mutex release unit, for releasing the mutex, resetting the value of the mutex counter to 0 and exiting the first process when the value of the mutex counter is greater than or equal to 1.

The hardware control apparatus further includes a driver initialization module. The driver initialization module includes: a fourth determination unit, for determining whether the first process is a first process that requests for access to the hardware device; and a driver initialization unit, for prompting the first process to establish a mutex based on a thread mutually exclusive access and a shared image file when the first process is the first process that request for access to the hardware device.

The shared process image file is a shared image file of the driver under the user mode, and is for recording the register and/or the I/O status data, containing data shared by all processes.

Different from the prior art, random access to a hardware device under a user mode can be implemented through obtaining the mutex and performing a context switch. That is, after the current process requiring access to the hardware device obtains the mutex, it is determined whether the identification of the current process requiring access to the hardware device and the identification of the previous process accessed the hardware device are the same in order to determine whether to perform the context switch on the two processes, thereby facilitating the access to hardware device in a multitasking environment. With the above approach, when accessing a complicated hardware device, driver performance under a user mode can be significantly enhanced while implementing secured random access to the hardware device in a multitasking environment.

The above and other aspects of the invention will become better understood with regard to the following detailed description of the preferred but non-limiting embodiments. The following description is made with reference to the accompanying drawings.

DETAILED DESCRIPTION OF THE DISCLOSURE

Figure 1:
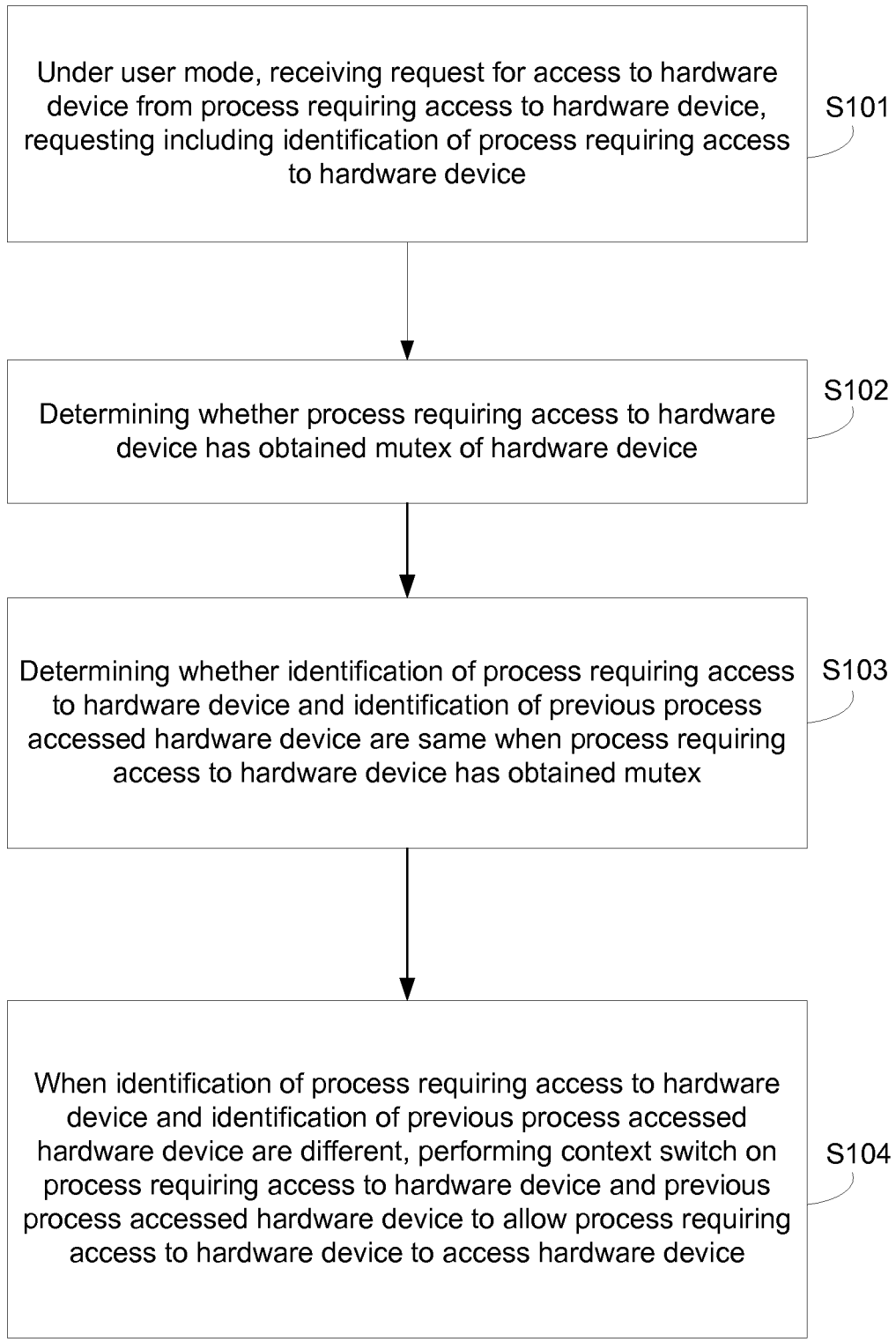
FIG. 1 is a flowchart of a hardware control method for multitasking drivers under a user mode according to an embodiment of the disclosure.

FIG. 1 shows a flowchart of a hardware control method for multitasking drivers under a user mode according to a first preferred embodiment of the disclosure. The hardware control method includes the following steps.

In step S101, under the user mode, a request for access to a hardware device from a process requiring access to the hardware device is received. The request includes an identification corresponding to the process requiring access to the hardware device.

A CPU of a Unix system, such as a Linux system, operates in two modes—a user mode and a kernel mode. A user operating under the user mode has restricted access to only a part of system resources, and is incapable of directly accessing kernel data structures to directly interact with kernel programs. In contrast, a program operating under the kernel mode can execute any CPU command, access any location of a 4 G memory space (taking a 32-bit CPU for example), and directly access desired core data structures or programs.

Under the user mode, a request for access to a hardware device from a process requiring access to the hardware device is received, e.g., a request for image processing.

A program includes at least one process, which includes at least one thread. Any process first includes a main thread (itself), and zero or more additional sub-threads. Thus, the process requiring access to the hardware device includes both a single-process and a multi-process. The single-process includes multiple threads, and the multi-process includes multiple threads.

During an initialization procedure of each process, the system designates a corresponding identification to the process for marking the process. A process is a program having independent functionality and is associated with a single operation of a particular data set, and is regarded as an independent unit for system resource allocation and scheduling. A thread is a physical part of a process, and is a basic unit of CPU scheduling and assignment. That is, a thread is an independently operable basic unit smaller than a process. Further, a thread itself does not own any system resources, and contains only a small amount of resources (e.g., a program counter, a set of registers, and a stack) necessary for operations. However, a thread together with other threads of a same process may share all respective resources owned by a particular process.

Step S101 further includes: performing driver initialization for the process requiring access to the hardware device. After performing the driver initialization for the process, the driver is provided with a thread mutual exclusion (mutex) based on thread mutually exclusive access and a shared image file.

The driver initialization includes: 1) determining whether the process requiring access to the hardware device is a first process requesting for access to the hardware device. It should be noted that, based on whether the process requiring access to the hardware device is the first process requesting for access to the hardware device, different approaches of driver initialization are selected for the process requiring access to the hardware device.

The initializing step further includes: 2) when the process requiring access to the hardware device is the first process requesting for access to the hardware device, prompting the process requiring access to the hardware device to establish a mutex based on a thread mutually exclusive access and a share image file; and when the process requiring access to the hardware device is not the first process requesting for access to the hardware device, prompting the process for access to the hardware device to directly obtain the established mutex and shared image file.

When performing driver initialization for the first process requesting for access to the hardware device, a mutex based on a thread mutually exclusive access and a shared image file need to be established. Once the mutex based on the thread mutually exclusive access and the shared image file are established, a process subsequently requiring access to the hardware device only needs to obtain the established mutex and the shared image file.

A shared image file is an image file shared drivers under a user mode. The shared image file records a register and/or an input/output (I/O) status data of a hardware device, and is data shared by all processes.

In step S102, it is determined whether the process requiring access to the hardware device has obtained the mutex of the hardware device.

The process requiring access to the hardware device first needs to obtain the mutex of the hardware device, and only has permission to access the hardware device once the mutex of the hardware device is obtained.

A mutually exclusive operation is a synchronization mechanism for controlling multitasking in performing serial access on shared data. In a multitasking application, data damage may be caused by two or more tasks simultaneously accessing shared data. The mutually exclusive operation allows multiple tasks to sequentially access the shared data to achieve data protection and avoid damage or corruption to the shared data.

The step of determining whether the process requiring access to the hardware device has obtained the mutex of the hardware device includes: 1) determining whether a value of a mutex counter of the process requiring access to the hardware device is greater than or equal to 1; 2) when the value of the mutex counter is greater than or equal to 1, determining that the process requiring access to the hardware device has obtained the mutex of the hardware device; when the value of the mutex counter is smaller than 1, determining that the process requiring access to the hardware device has not yet obtained the mutex of the hardware device.

In the above step, by determining whether the value of the mutex counter is greater than or equal to 1, it is determined whether the process requiring access to the hardware device has obtained the mutex of the hardware device.

Step S102 of determining whether the process requiring access to the hardware device has obtained the mutex of the hardware device further includes: 1) when the process requiring access to the hardware device has obtained the mutex of the hardware device, determining whether an identification of a thread requiring the hardware device and an identification of a thread having obtained the mutex are the same; and 2) when the identification of the thread requiring access to the hardware device and the identification of the thread having obtained the mutex are the same, adding the value of the mutex counter by 1 and allowing the thread requiring access to the hardware device to continue utilizing the hardware device; when the identification of the thread requiring access to the hardware device and the identification of the thread having obtained the mutex are different, the thread requiring access to the hardware device waiting until the mutex is obtained.

In step S103, when the process requiring access to the hardware device has obtained the mutex, it is determined whether an identification of the process requiring access to the hardware device and an identification of a previous process accessed the hardware device are the same.

When the identification of the process requiring access to the hardware device and the identification of the previous process accessed the hardware device are the same, it means that the process requiring access to the hardware device and the previous process accessed the hardware device are the same process, and the process requiring access to the hardware device then continues utilizing the hardware device.

When the identification of the process requiring access to the hardware device and the identification of the previous process accessed the hardware device are different, it means that the process requiring access to the hardware device and the previous process accessed the hardware device are different processes.

In step S104, when the identification of the process requiring access to the hardware device and the identification of the previous process accessed the hardware device are different, a context switch is performed on the process requiring access to the hardware device and the previous process accessed the hardware device to switch the process requiring access to the hardware device to access the hardware.

The context switch is performed on kernel contents of multitasking scheduling and also a foundation of multiple programs operating in parallel. In a context switch event, the CPU control switches from a current task in operation to another task ready for operation. When the current task in operation is changed to a ready state (or a standby or deleted state), the other selected task ready for operation becomes the current task in operation. The context switch stores an operation environment of the current task in operation and restores an operation environment of the task to be executed. The task here refers to an application each having at least one process.

When the process requiring access to the hardware device and the previous process which accessed the hardware device are the same process, it means that the state of the previous process accessed the hardware device is the state of the process requiring access to the hardware device. Therefore, no context switch is performed in such a situation.

In contrast, when the process requiring access to the hardware device and the previous process which accessed the hardware device are different processes, it means the states of the hardware devices of the two processes are different. Therefore, a context switch is performed in such a situation. That is, through the context switch, the process requiring access to the hardware device is allowed to access the hardware device.

In step S104, a context switch is performed on the process requiring access to the hardware device and the previous process accessed the hardware device. More specifically, in step S104, a register and/or an I/O status data is read from a stored process image file of the process requiring access to the hardware device, and the read register and/or I/O status is written into the hardware device. Since the hardware device is restored to a configuration of the process requiring access to the hardware device, the process is then allowed to access the hardware device.

A process image file is a process image file of a driver for a process under the user mode. A process image file is for recording a register and/or an I/O status data, and is exclusive data of a corresponding process.

After the process requiring access to the hardware device finishes accessing the hardware device, the hardware control method further includes: 1) determining whether the value of the mutex counter of the process requiring access to the hardware device is smaller than 1 when the process requiring access to the hardware device finishes accessing the hardware device; and 2) releasing the mutex and exiting an in-use status of the hardware device when the value of the mutex counter is smaller than 1, or subtracting the value of the mutex counter by 1 when the value of the mutex counter is greater than or equal to 1.

The process requiring access to the hardware device utilizes the hardware device via one or multiple application programming interfaces (APIs).

In the present disclosure, it is first ensured that each API of a driver correspondingly developed for an application is single-functional as often as possible. By modularizing hardware functions, in order to implement a function module, an application needs to utilize one or multiple APIs of corresponding drivers, e.g., a first API Driver API1 of the first driver, a second API Driver API2 of the second driver, and a third Driver API3 of the third driver. Thus, each API is protected under the mutually exclusive access mechanism of the operating system to ensure the mutually exclusive access to hardware devices in a multitasking environment.

In a single-process and multi-thread environment, each thread directly accesses the desired hardware device through the mutex in a secured manner.

Further, in a multi-process and multi-thread environment, it is first checked whether the previous process accessed the driver and the current process requiring access to the driver are the same process.

When the previous process accessed the driver and the current process requiring access to the driver are the same process, the current process requiring access to the hardware device is allowed to obtain the permission to access the hardware device under the mutex protection mechanism.

When the previous process accessed the driver and the current process requiring access to the driver are different processes, the current process requiring access to the hardware device first needs to obtain the mutex. Obtaining the mutex is substantially equal to the obtaining the access permission to the hardware device. At this point, the hardware device is set to the configuration of the current process requiring access to the hardware device, and the request for access to the hardware device proceeds.

With respect to data structure categorization, data shared among various applications are stored in a shared memory space. However, independent data of applications are stored in a memory space of processes (as static variables), and are exclusive to corresponding applications.

To reserve a "scene" of hardware settings for each process so that the "scene" of the hardware device can be restored in subsequent processes for conveniently resuming previously interrupted processes, a driver needs to store a copy of process image file of registers of the hardware device. The process image file is an independent file exclusive to a corresponding application, and stores static variables that are available to only the exclusive application.

In addition, to increase an operation speed of a driver while allowing various processes to share hardware information, a driver further needs to maintain a shared image file of registers. That is, shared data of various processes are stored in a shared memory space for the reference of all processes.

Therefore, registers of all hardware devices are categories when abstracting hardware characteristics of drivers—process exclusive, process shared, and miscellaneous. Further, for the process exclusive and process shared categories, a driver separately stores two image files—a process image file and a shared image file.

Image files of process exclusive registers and miscellaneous registers are defined as static variables, and are stored in process image files. On the other hand, image files of process shared registers are stored in shared image files.

During each writing process of a value of a register, the value is also updated to a corresponding image file when writing the value into a register of a physical hardware device. Similarly, register values are categorized when the register values are read. Process exclusive or shared register values may be read from corresponding image files, whereas miscellaneous register values (e.g., values of status registers) are directly read from the hardware device.

Accordingly, a hardware image file is established for each process.

When the system program switches from a process A to a process B having a higher priority, process B is required to have obtained access permission to the hardware device. When the process B finishes its operations, the system needs to switch back to the process A; the driver also discovers that the processes need to be switched.

Hence, when the system switches from the process B back to the process A, the system first reads the register value of the process A from the process image file stored in the process memory space, and rewrites the register value to be restored to the hardware device.

After performing the above procedure, the hardware device returns to the state of the process A, so that the process A is allowed to resume previously interrupted hardware operations. During the switch procedure of the processes, since all operations are packaged in the driver, differences are not sensed by upper-layer applications, as if the hardware device is exclusive.

According to the disclosure, two register image files are established during driver initialization—a process image file and a shared image file. The process image file stores register values respectively provided for exclusive processes, and the shared image file stores register values that are the same or are to be shared by the processes.

Taking a graphic processor in an application of the disclosure for example, register values associated with bit block image transfer bitblt, such as information associated with the source and destination buffer including address, memory format, width, height, pitch, color key, and external palette table address, all need to be stored in a process image file.

Certain registers associated with a graphic engine, such as engine enable, engine rest, command queue enable, virtual command queue size, and virtual command queue enable, all need to be stored in a shared image file to be shared by all processes, so as to avoid repetitive, random, and conflicting settings that may lead to a system crash.

Further, with respect to other read-only status registers, such as engine status and command queue status, values of these status registers are directly read from the hardware device and thus do not need to stored in an image file.

According to the above categorization, the register of the driver is written into a function, and the register values are also written into corresponding image files while writing the values into the physical hardware. Similarly, when reading the registers from the function, register values can be directly read from the corresponding image files according to the above categorization, and other register values are directly read from the hardware device.

Figure 2:
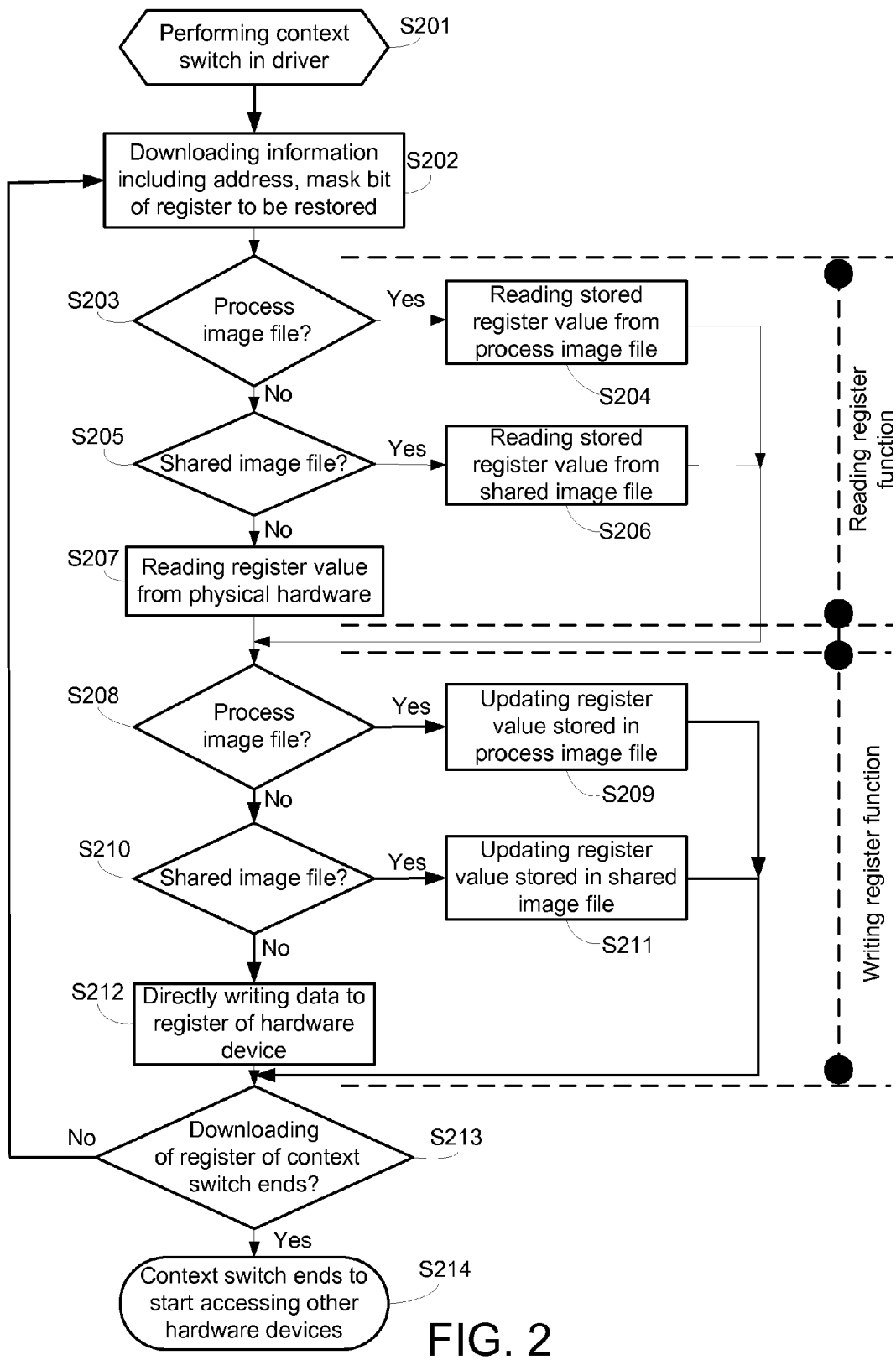
FIG. 2 is a flowchart of a context switch in a hardware control method for multitasking drivers under a user mode according to an embodiment of the disclosure.

During the context switch, the above "register read function" is directly called for register values that need to be restored. Since the process exclusive register values are read from the process image file, the previous hardware register settings before the process requiring access to the hardware device is switched away by the system scheduling are also read. The read values are written into the hardware registers via the "register write function" to complete the "scene restoration" for the hardware device, thereby achieving the context switch. FIG. 2 shows a flowchart of a context switch process according to an embodiment of the disclosure. With reference to FIG. 2, the context switch includes the following steps.

In step S201, a context switch is performed in a driver.

In step S202, data including an address and a mask bit of a register to be restored is downloaded.

In step S203, when reading the register data, it is determined whether the data is a process image file. Step S204 is performed when the data is a process image data, or else step S205 is performed when the data is not a process image data.

In step S204, a stored register value is read from the process image file. The register value is the data to be read. The process then proceeds to step S208.

In step S205, it is determined whether the data is a shared image file. Step S206 is performed when the data is a shared image file, or else step S207 is performed when the data is not a shared image file.

In step S206, the reserved register value is read from the shared image file. The register value is the data to be read. The process then proceeds to step S208.

In step S207, the register value of the physical hardware is read.

In step S208, it is determined whether the data is a process image file when writing the data to the register. That is to say, step S209 is performed when the data is a process image file, or else step S210 is performed when the data is not a process image file.

In step S209, the register value stored in the process image file is updated, followed by proceeding to step S213.

In step S210, it is determined whether the data is a shared image file. Step S211 is performed when the data is a shared image file, or else step S212 is performed when the data is not a shared image file.

In step S211, the data is updated to the register value stored in the shared image file, following by proceeding to step S213.

In step S212, the data is directly written into the register of the hardware device.

In step S213, it is determined whether downloading of the register of the content switch has ended. Step S214 is performed when the downloading ends, or else step S202 is iterated when the downloading has not yet ended.

In step S214, the context switch ends to start access to other hardware devices.

In the driver design according to an embodiment of the disclosure, the first process that performs driver initialization first requests the system for the establishment of a mutex based on the thread mutually exclusive access, and establishes the data structure associated with the shared image file. After the establishment, the subsequent process may then directly obtain and utilize the established mutex and shared image file. Each time when a process performs the driver initialization, the driver first records a process identification (PID) of the process.

An entry program drv_entry is defined in a public API of each driver, and a part of a code of the entry program drv_entry needs to first determine whether the process requiring access to the hardware device has obtained the mutex.

When the mutex is not yet obtained, the process requiring access to the hardware device waits until the mutex is obtained. A thread identification (TID) of the mutex is recorded, and a value of a mutex counter that records the number of the thread successively occupying the mutex is added by 1.

When the mutex is obtained, it is determined whether the current TID and the TID having obtained the mutex are the same. When the two TIDs are the same, the value of the mutex counter is added by 1 to indicate that the thread requests for a successive occupancy of the mutex and the hardware device, and so the thread may continue to access the hardware device using the driver. When the current TID and the TID occupying the mutex are different, delay occurs until the mutex is obtained.

Once the thread has obtained the mutex, the TID of the mutex is also first recorded to indicate that the access permission to the hardware device is obtained. The value of the mutex counter is added by 1 at the same time.

A part of the code of the entry program drv_entry continues in checking whether the previous PID obtained the mutex and the PID of the current process requiring access to the hardware device are the same. Subsequent operations are allowed when the two PIDs are the same, or else the subsequent operations are only allowed after restoring the hardware device to a state previous to the process.

Figure 3A:
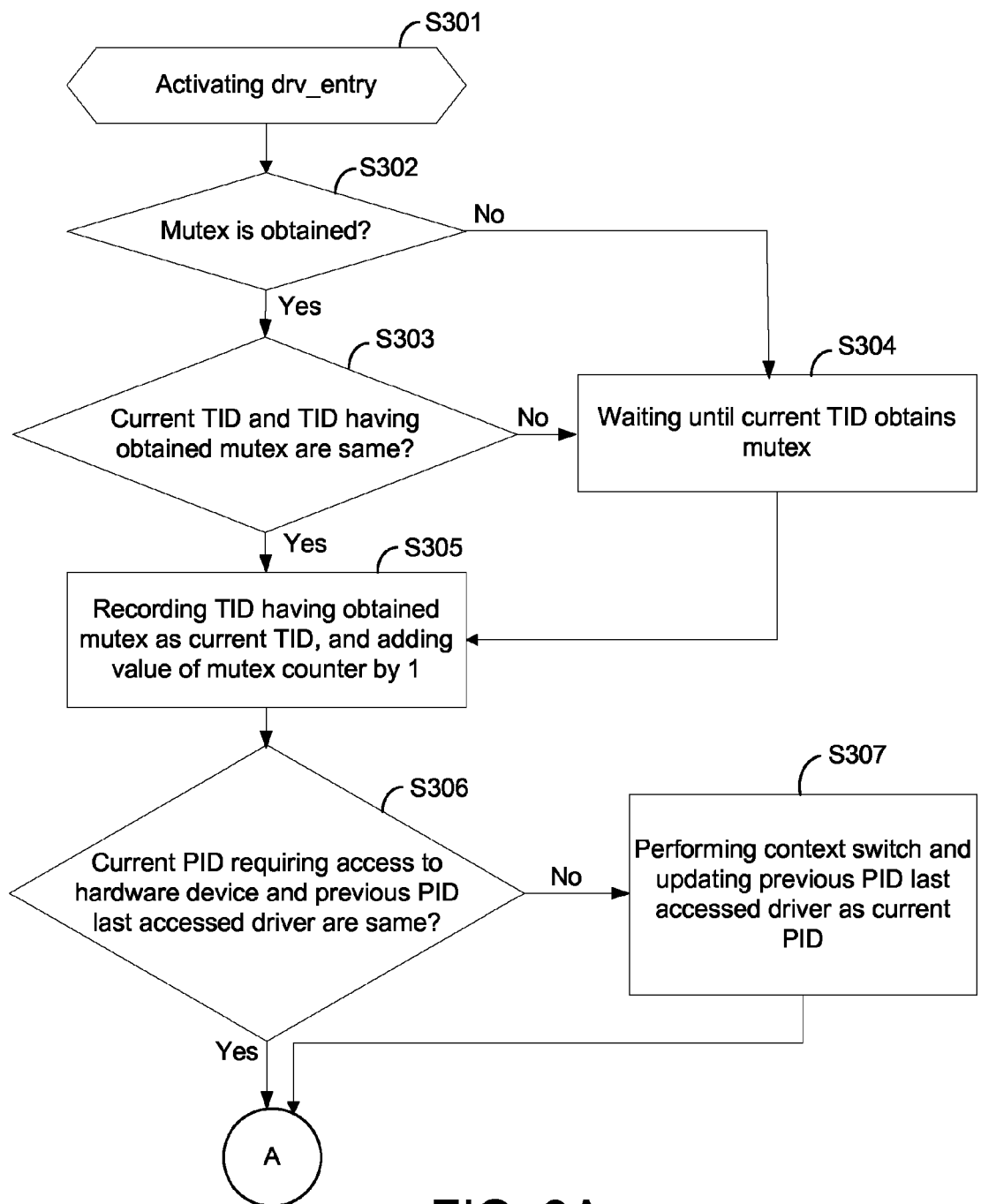
FIG. 3A and FIG. 3B are a flowchart of implementing entering and exiting APIs in a multitasking approach in a hardware control method for multitasking drivers under a user mode according to an embodiment of the disclosure.
Figure 3B:
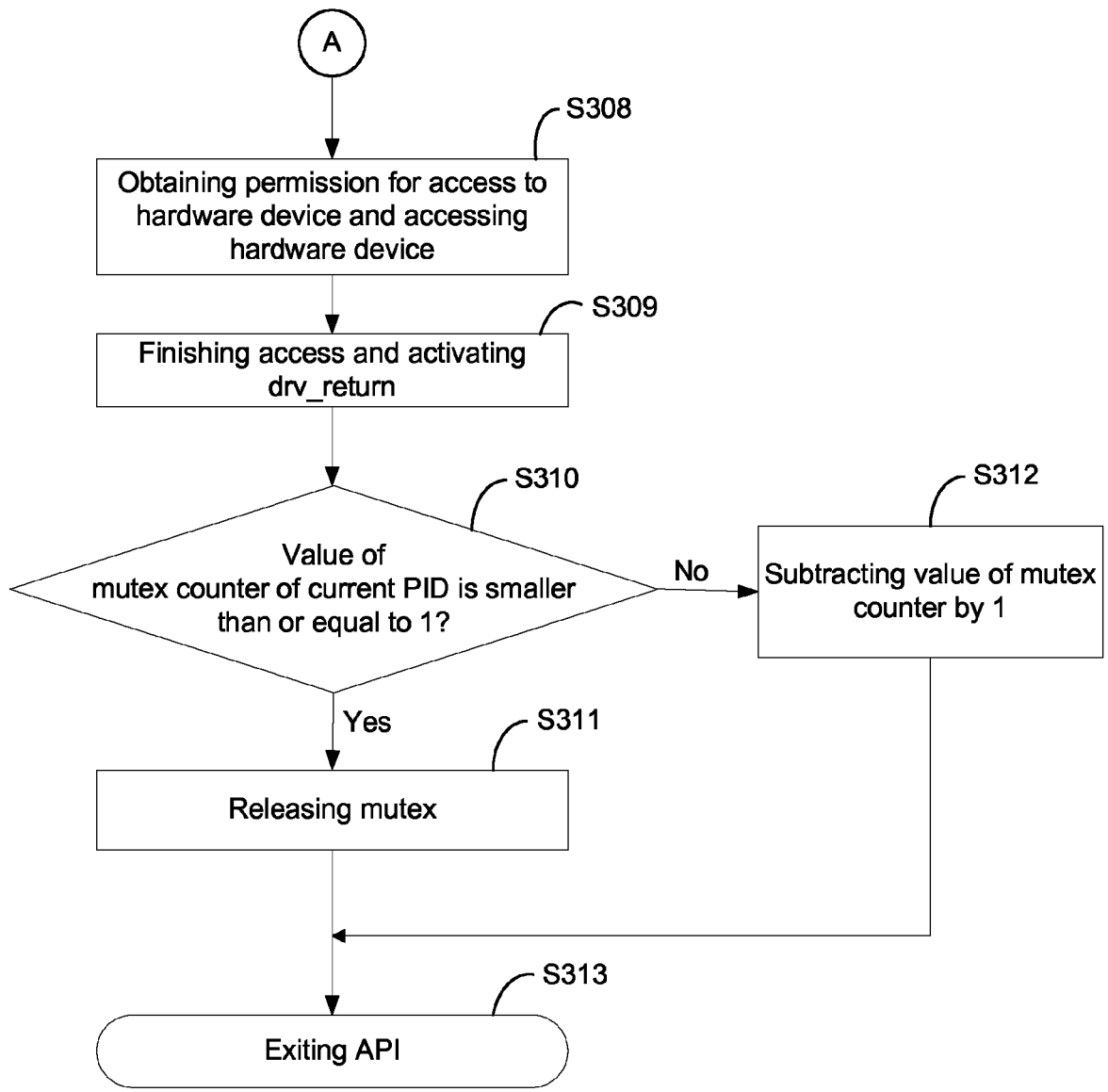

Similar to the entry program drv_entry, an ending part of an API of each driver includes an exit program drv_return. A part of a code of the exit program drv_return confirms whether the current thread has obtained the mutex, and releases the mutex when the value of the mutex is equal to 1, or subtracts the value of the mutex by 1 (the mutex is not released to satisfy the need of successive occupancy of the mutex and the hardware device) and returns. FIGS. 3A and 3B a show flowchart of the process of the entry program drv_entry and the exit program drv_return.

In step S301, a driver API and an entry program drv_entry are activated.

In step S302, the entry program drv_entry of the driver API determines whether the current process requiring access to the hardware device has obtained the mutex. Step S303 is performed when the current process requiring access to the hardware device has obtained the mutex, or else step S304 is performed when the current process requiring access to the hardware device has not yet obtained the mutex.

In step S303, it is determined whether a current TID and a TID having obtained the mutex are the same. Step S305 is performed when the current TID and the TID having obtained the mutex are the same, or else step S306 is performed when the current TID and the TID having obtained the mutex are different.

In step S304, delay occurs until the current TID has obtained the mutex, followed by proceeding to step S305.

In step S305, the TID having obtained the mutex is recorded as the current TID, and the value of the mutex counter is added by 1.

In step S306, it is determined whether a PID requiring access to the hardware device and a previous PID last accessed the driver are the same. Step S308 is performed when the current PID requiring access to the hardware device and the previous PID last accessed the driver are the same, or else step S307 is performed when the current PID requiring access to the hardware device and the previous PID last accessed the driver are different.

In step S307, a context switch is performed in the driver to update the previous PID last accessed the driver as the current PID, following by proceeding to step S308.

In step S308, permission for accessing the hardware device is obtained and the hardware device is then utilized.

In step S309, utilization of the hardware device completes, and an exit program drv_return of the driver API is activated.

In step S310, the exit program drv_return of the driver API determines whether the value of the mutex counter of the current PID is smaller than or equal to 1. Step S311 is performed when the value of the mutex counter of the current PID is smaller than or equal to 1, or else step S312 is performed when the value of the mutex counter of the current PID is greater than 1.

In step S311, the exit program drv_return of the driver API releases the mutex.

In step S312, the value of the mutex counter is subtracted by 1, followed by proceeding to step S313.

In step S313, the exit program drv_return of the driver API exits the API.

A resource exclusive mode is also provided by the disclosure. Under the resource exclusive mode, a process requiring access to a hardware device has exclusive access to resources of the hardware device. The resource exclusive mode is only available with a request. In the process of step S101, a request of a process requiring exclusive access to the hardware device includes: 1) determining whether the request is a request for a resource exclusive mode; wherein, when the request is the request for the resource exclusive mode, a start API under the resource exclusive mode obtains the mutex of the hardware device, and the process requiring access to the hardware device continues utilizing the hardware device until the process requiring access to the hardware device completes all operations; and 2) releasing the mutex after the process requiring access to the hardware device completes all the operations, and exiting an in-use status of the hardware device.

In the disclosure, the resource exclusive mode opens two APIs to the public through drivers—an API API_BeginDraw and an API API_EndDraw. Therefore, the object of having exclusive access to the hardware device is achieved by providing an application that can freely obtain and release the driver mutex.

The API API_BeginDraw first occupies the mutex via the entry program drv_entry, but does not call the exit program drv_return when exiting the mutex. That is, the mutex stays unreleased such that the application may maintain the status of occupying the mutex.

The API API_EndDraw checks whether the application executes the API API_BeginDraw. When the mutex is obtained, the exit program drv_return is directly executed to release the obtained mutex.

Through the two APIs above, the application is allowed to keep an ownership of the mutex and prohibiting other threads or processes to enter the driver to utilize the hardware device, thereby achieving the object of resource exclusivity.

When the application finishes accessing the hardware device, the resource exclusive mode can be exited through the API API_EndDraw. By occupying the mutex through executing the API API_BeginDraw, the thread in fact has obtained the exclusive access permission to the hardware device. In other access attempts of the other APIs subsequent to the thread, the entry program drv_entry discovers that the thread consistently occupies the mutex, and only adds 1 to the number of times that the thread occupies the mutex.

Similarly, in the code of the exit program drv_return, it is discovered that the value of the mutex counter of the current thread is greater than 1, and so the value of the mutex counter is subtracted by 1 while the mutex stays unreleased.

During the above process, the thread maintains the ownership of the mutex and so the hardware device can be controlled to continue operating. When other processes or threads send a request for accessing the hardware device, the hardware device cannot be accessed as the mutex cannot be obtained to lead to congestion. Therefore, the context switch is not performed when the thread continuously accesses the hardware device.

When the thread completes all operations and exits the driver API (the code calling the exit program drv_return once) of the last operation to release the hardware device, the called API API_EndDraw again executes the code of the exit program drv_return. At this point, it is discovered that the value of the mutex counter is equal to 1, and so the mutex is released to allow other processes to subsequently access the hardware device.

An abnormality exit protection mechanism is further provided according to an embodiment of the disclosure. The protection mechanism requests registration of a program process termination function Drv_atexit of the process requiring access to the hardware device. The program process termination function Drv_atexit recycles information of all the data of the process requiring access to the hardware device and restores the hardware device status.

The protection mechanism include steps of: 1) determining whether the process requiring access to the hardware device is utilizing the hardware device; 2) releasing the hardware device when the process requiring access to the hardware device is utilizing the hardware device; 3) determining whether the value of the mutex counter of the process is greater than or equal to 1 when the process requiring access to the hardware device is not utilizing the hardware device; and 4) when the value of the mutex counter is greater than or equal to 1, releasing the mutex, resetting the value of the mutex counter to 0, and exiting the process requiring access to the hardware device.

In the disclosure, through a program process termination function registered by a function atexit all software data structure information and hardware device resources associated with the process in the driver are collected and processed. The process performed on the software data structure information and hardware device resources includes: resetting all the internal data of the driver to an initial status, and releasing the hardware device occupied by the process, e.g., shutting down a display engine that is in an activated state and occupied by the process.

Figure 4:
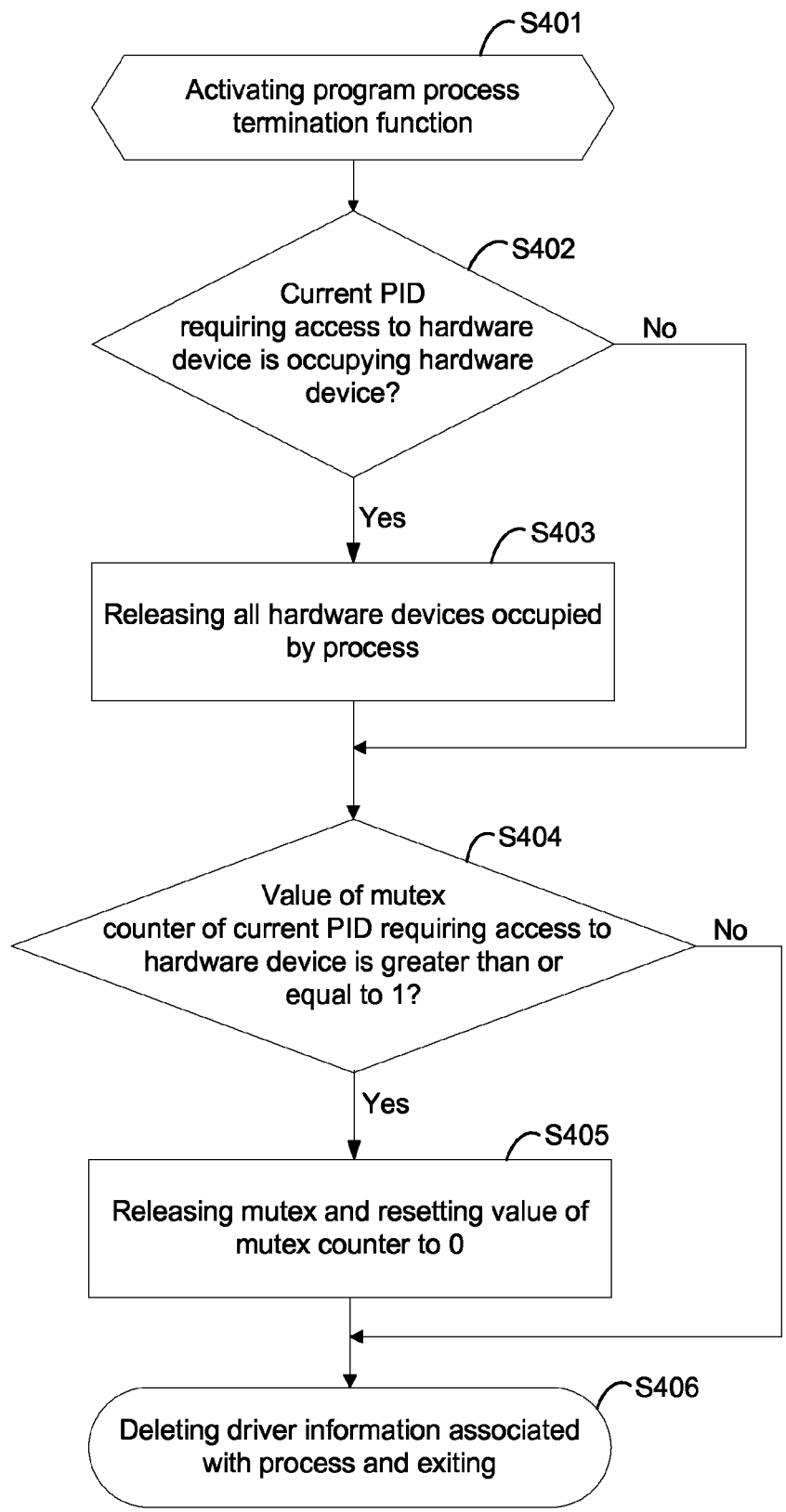
FIG. 4 is a flowchart of a process performed on the program process termination function registered by the function atexit according to an embodiment of the disclosure.

The value of the mutex counter of the process is then checked. When the value of the mutex counter is greater than 0, the value of the mutex counter is directly cleared to 0 and all mutexes occupied by the process are released to exit the program process termination function. FIG. 4 shows a flowchart of a process performed on the program process termination function registered by the function atexit.

In step S401, the program process termination function Drv_atexit is activated.

In step S402, the program process termination function Drv_atexit determines whether a current PID requiring access to the hardware device is occupying the hardware device. Step S403 is performed when the current PID requiring access to the hardware device is occupying the hardware device, or else step S404 is performed when the current PID requiring access to the hardware device is not occupying the hardware device.

In step S403, all hardware devices occupied by the process are released.

In step S404, the program process termination function Drv_atexit determines whether a value of a mutex counter of the current PID requiring access to the hardware device is greater than or equal to 1. Step S405 is performed when value of the mutex counter is greater than or equal to 1, or else step S406 is performed when value of the mutex counter is smaller than 1.

In step S405, the mutex is released to reset the value of the mutex counter to 0.

In step S406, driver information of the process is cleared to exit the program process termination function Drv_atexit.

Figure 5:
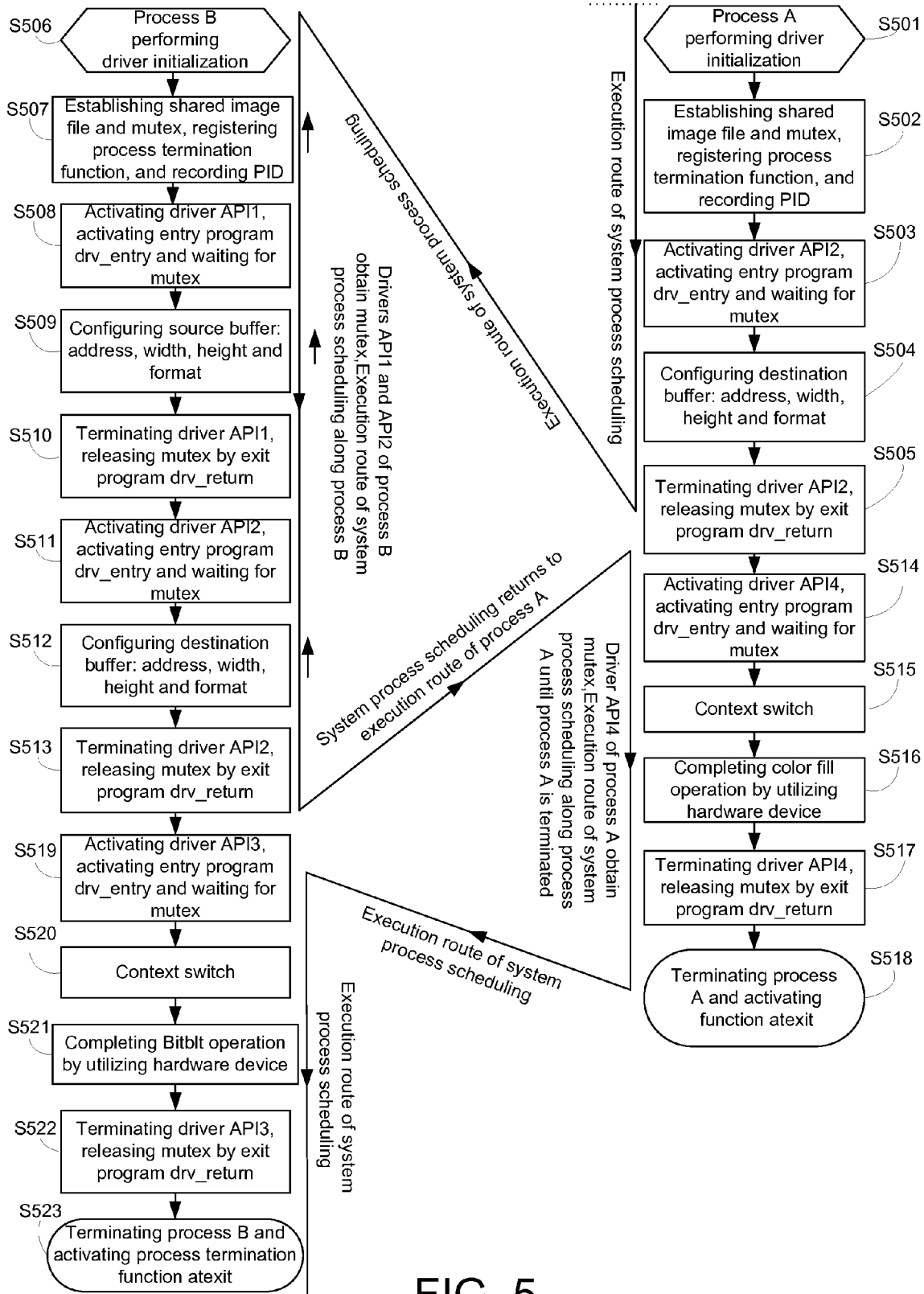
FIG. 5 is a stereotypic flowchart of a hardware control method for multitasking drivers under a user mode in a multitasking environment according to an embodiment of the disclosure.
Figure 6:
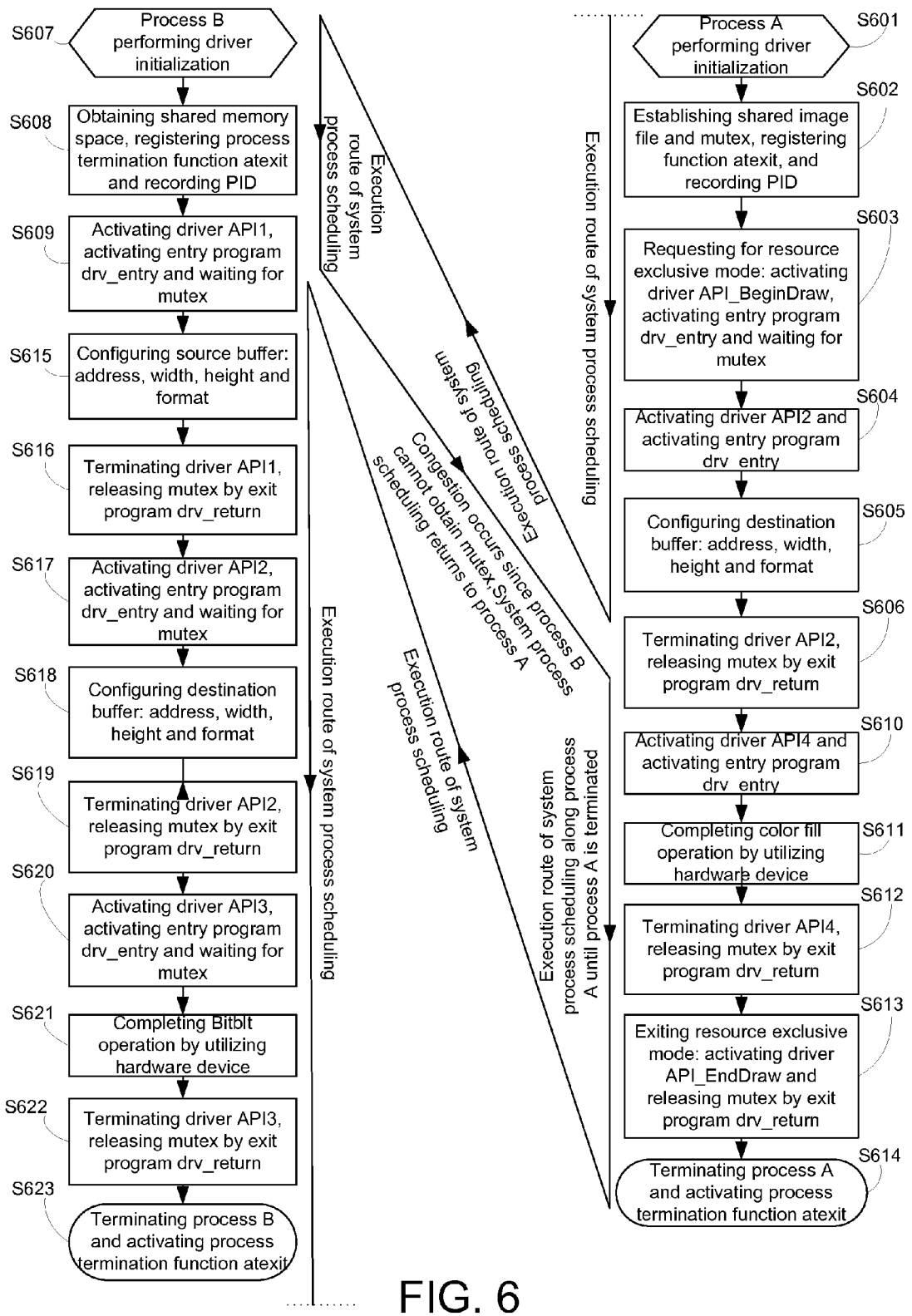
FIG. 6 is a flowchart of a resource exclusive mode and hardware control method for multitasking drivers under a user mode in a multitasking environment according to an embodiment of the disclosure.

FIG. 5 and FIG. 6 show flowcharts of a hardware control method for multitasking drivers under a user mode according to two embodiments of the disclosure.

Assume that a process A is a first process that performs driver initialization after a system power-on. After activating the system, the process A transmits a request for a performing a color fill operation (requiring driver APIs 2 and 4) for a destination buffer to a driver. Before the process A completes the above task, another process B also transmits a request for performing a bit block transfer (Bitblt) operation (requiring driver APIs 1, 2 and 3) from a source buffer to a destination buffer to the driver. Under system scheduling, the two processes are alternately executed. The two applications can be implemented under a multitasking structure of drivers of the disclosure.

Referring to the flowchart in FIG. 5, under normal circumstances, the two processes have equal permission to hardware devices under system scheduling.

In step S501, the process A performs driver initialization.

In step S502, a shared image file is established, a mutex is established, a program process termination function for the process A is registered via atexit, and a PID of the process A is recorded.

The process A is a first process that performs driver initialization. Therefore, a mutex and a shared image file need to be established, and the program process termination function is meanwhile registered. The purpose of recording the PID of the process A is to provide a reference for determining whether the process A and a previous process accessed the hardware device are the same.

In step S503, the driver API2 is activated, an entry program drv_entry is activated, and it is waited to obtain the mutex.

A process requiring access to a hardware device utilizes the hardware device via one or multiple APIs. The entry program drv_entry is first activated, and it is determined whether the process A has obtained the mutex according to a value of a mutex counter.

In step S504, the mutex is obtained, information associated with the destination buffer such as address, width, height, and format is configured, and the hardware device is accessed after having obtained the mutex.

In step S505, the driver API2 is terminated, and an exit program drv_return releases the mutex.

By terminating the driver API 2 and activating the exit program drv_return, it is ensured that the mutex is released according to the value of the mutex counter.

In steps S501 to S505, the program B transmits a request for accessing the hardware device, and the driver API1 of the process B obtains the mutex after the driver API2 of the process A releases the mutex.

In step S506, the process B performs driver initialization.

In step S507, the shared image file is obtained, the function atexit is registered, and the PID is recorded.

The process B is not the first process that performs driver initialization, and so the only the shared image file and the mutex are obtained while also the program process termination function is also registered.

In step S508, the driver API1 is activated, the entry program drv_entry is activated, and it is waited to obtain the mutex.

In step S509, the mutex is obtained, and information associated with the source buffer such as the address, width, height, and format is configured.

In step S510, the driver API1 is terminated, and the exit program drv_return releases the mutex.

In step S511, the driver API2 is activated, and the entry program drv_entry is activated to wait for the mutex.

In step S512, information associated with the destination buffer such as the address, width, height, and format is configured.

In step S513, the driver API2 is terminated, and the exit program drv_return releases the mutex.

In steps S506 to S513, the process A transmits a request for access to the hardware device, and the driver API4 of the process A obtains the mutex after the driver API2 executed by the process B releases the mutex.

In step S514, the driver API4 is activated, and the entry program drv_entry is activated to wait for the mutex.

In step S515, a context switch is performed, and a configuration of the hardware device is detected and restored.

At this point, the PID of the process A and the PID of the previous process B accessed the hardware device are different, meaning that the process A and the process B are not the same process. Therefore, the context switch is performed on the process A and the process B.

More specifically, the step of performing the context switch on the process A and the process B includes: reading a register and/or an I/O status data from a stored program image file of the driver of the process A, and writing the read register and/or I/O status data to the hardware device to restore the hardware device to the configuration corresponding to the process A.

In step S516, the color fill operation is completed by utilizing the hardware device.

In step S517, the driver API4 is terminated, and the exit program drv_return releases the mutex.

In step S518, the process A is terminated, and the function atexit is activated.

After the process A completes the operation and finishes accessing the hardware device, the mutex is released and the process A is terminated. During the operation procedure of the process A, the function atexit recycles all information of the process A and restores the hardware device status in the event of an abnormal exit. Details of the function atexit may be referred in the foregoing descriptions.

In steps S514 to S518, the process B transmits a request for access to the hardware device, and the driver API3 of the process B obtains the mutex after the API4 executed by the process A releases the mutex.

In step S519, the driver API3 is activated, the entry program drv_entry is activated, and it is waited to obtain the mutex.

In step S520, a context switch is performed, and the configuration of the hardware device is detected and restored.

In step S521, the Bitblt operation is completed by utilizing the hardware device.

In step S522, the driver API3 is terminated, and the exit program drv_return releases the mutex.

In step S523, the process B is terminated, and the process termination function atexit is activated.

In the process of the flowchart shown in FIG. 5, an exemplary application of two processes having equal permission to the hardware device under system scheduling under normal circumstances where the resource exclusive mode to the processes is unavailable. In the description below, an exemplary application of the process A requesting for the resource exclusive mode and given the priority for acquiring the permission to the hardware device is described with reference to FIG. 6.

FIG. 6 depicts the same application example as that in FIG. 5, with however the process A utilizing the resource exclusive mode of the driver and being prioritized in acquiring the permission to the hardware device. Referring to FIG. 6, according to an embodiment, the application includes the following steps.

In step S601, the process A performs driver initialization.

In step S602, a shared image file is established, a mutex is established, a function atexit for the process A is registered, and a PID of the process A is recorded.

The driver initialization of the process A in this application is fundamentally the same as that in the application in FIG. 5. A main difference between the two is that, in FIG. 6, the request for the resource exclusive mode includes a start design development API API_BeginDraw and an end design development API API_EndDraw, which are both available only under the resource exclusive mode.

Under the resource exclusive mode, the start design development API API_BeginDraw obtains the mutex of the hardware device, and the process requiring access to the hardware device will continue utilizing the hardware device until all operations of the process requiring access to the hardware device are completed.

In step S603, the process A transmits a request for the resource exclusive mode. The driver API_BeginDraw is activated, the entry program drv_entry is activated, and it is waited to obtain the mutex.

In step S604, the driver API2 is activated, and the entry program drv_entry is activated.

In step S605, the mutex is obtained, information associated with the destination buffer such as address, width, height, and format is configured.

In step S606, the driver API2 is terminated, and the exit program drv_return is activated.

In steps S601 to S606, the process B transmits a request for access to the hardware device, and the system scheduling enters the process B after the API2 of the process A is terminated.

In step S607, the process B performs driver initialization.

In step S608, a shared memory space is obtained, the process termination function atexit is registered, and the PID is recorded.

In step S609, the driver API1 is activated, the entry program drv_entry is activated, and it is waited to obtain the mutex.

Although the process B at this point requests for access to the hardware device, the process B is incapable of obtaining the mutex and becomes congested since the process A is under the resource exclusive mode, and so the system process scheduling returns to the process A.

In step S610, the driver API4 is activated, and the entry program drv_entry is activated.

In step S611, the color fill operation is completed by utilizing the hardware device.

In step S612, the driver API4 is terminated, and the exit program drv_return is activated.

In step S613, the process A exits the resource exclusive mode. The end driver API_EndDraw is activated, and the exit program drv_return releases the mutex.

The above step is the foregoing step of releasing the mutex after the process requiring access to the hardware device finishes all the operations and exiting the in-use status of the hardware device.

In step S614, the process A is terminated, and the process termination function atexit is activated.

After the process A completes all the operations and the driver API4 releases the mutex, the driver API1 of the process B requesting for access to the hardware device obtains the mutex.

In step S615, information associated with the source buffer such as the address, width, height, and format is configured, and the hardware device is configured.

In step S616, the driver API1 is terminated, and the exit program drv_return releases the mutex.

In step S617, the driver API2 is activated, and the entry program drv_entry is activated to wait for the mutex.

In step S618, information associated with the destination buffer such as the address, width, height, and format is configured.

In step S619, the driver API2 is terminated, and the exit program drv_return releases the mutex.

In step S620, the driver API3 is activated, and the entry program drv_entry is activated to wait for the mutex.

In step S621, the Bitblt operation is completed by utilizing the hardware device.

In step S622, the driver API3 is terminated, and the exit program drv_return releases the mutex.

In step S623, the process B is terminated, and the process termination function atexit is activated.

The above application flow is a flow of the process A under the resource exclusive mode. Although the process B requests for access to the hardware device when the process A is utilizing the hardware device, since the process A operates under the resource exclusive mode and maintains the ownership of the mutex, the process B is incapable of obtaining the mutex and thus has no access to the hardware device. Only when the process A releases the mutex after completing all the operations, the process B can obtain the mutex to access the hardware device.

Different from the prior art, random access to a hardware device under a user mode can be implemented through obtaining the mutex and performing the context switch. That is, after the current process requiring access to the hardware device obtains the mutex, it is determined whether the identification of the current process requiring access to the hardware device and the identification of the previous process accessed the hardware device are the same to determine whether to perform the context switch on the two processes, thereby facilitating the access to hardware device in a multitasking environment. With the above approach, when accessing a complicated hardware device, the driver performance under a user mode can be significantly enhanced to at the same time implement random and secured accesses to the hardware device in a multitasking environment.

Further, since the driver is provided under a user mode in the disclosure, the General Public License (GPL) contamination can be avoided so that a source code can stay undisclosed, so that solution providers can develop unique applications based on the source codes that are not open to the public. Moreover, system performance in a multitasking environment is significantly enhanced to considerably reduce system loadings brought by frequent accesses under a kernel mode.

Further, the drivers adopts a method of categorized registers and reading most register values from the image files to implement the context switch, so as to prevent a long waiting period for reading register values from certain hardware device sequences to further promote the driver performance.

It is discovered through actual tests on a graphic processing display platform that, the application according to an embodiment of the disclosure enhances the driver performance by approximately 30% under a kernel mode compared to the prior art. As each task is protected by the context switch protection mechanism, each application feels as if it has exclusive access to the hardware device and performs tasks according to its own requirements, thereby ideally implementing hardware sharing among multiple processes.

Through the resource exclusive mode, customized demands on hardware or performance under different application requirements can be fulfilled to provide flexibilities and ease of use. By registering the process termination function, it is ensured that operations of recycling the driver resources and restoring the hardware device are completed when an application does not normally release the hardware device or abnormally exits the hardware device.

Figure 7:
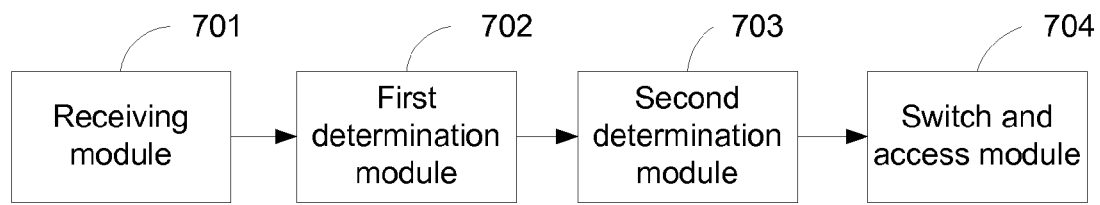
FIG. 7 is a block diagram of a hardware control apparatus for multitasking drivers under a user mode according to an embodiment of the disclosure.

FIG. 7 shows a block diagram of a hardware control apparatus for multitasking drivers under a user mode according to a preferred embodiment of the disclosure. The hardware control apparatus includes a receiving module 701, a first determination module 702, a second determination module 703, and a switch and access module 704.

The receiving module 701 receives a request for access to a hardware device from a process requiring access to the hardware device under a user mode. The request includes a PID of the process requiring access to the hardware device.

The first determination module 702 determines whether the process requiring access to the hardware device has obtained a mutex of the hardware device.

When the process requiring access to the hardware device has obtained the mutex, the second determination module 703 determines whether the PID of the process requiring access to the hardware device and a PID of a previous accessed the hardware device are the same.

When the PID of the process requiring access to the hardware device and the PID of the previous accessed the hardware device are different, the switch and access module 704 performs a context switch on the process requiring access to the hardware device and the previous process accessed the hardware device to allow the process requiring access to the hardware device to access the hardware device.

The process requiring access to the hardware device utilizes the hardware device through one or multiple design and development APIs.

The hardware control apparatus further includes a driver initialization module, which includes a fourth determination unit and a driver initialization unit.

The fourth determination unit determines whether the process requiring access to the hardware device is a first process requesting for access to the hardware device.

When the process requiring access to the hardware device is the first process requesting for access to the hardware device, the driver initialization unit prompts the process requiring access to the hardware device to establish a mutex based on a thread mutually exclusive access and a shared image file for the process requiring access to the hardware device. For a process that is not the first process requesting for access to the hardware device, the driver initialization unit prompts the process requiring access to the hardware device to obtain the established mutex and shared image file.

When the process that is the first process requesting for access to the hardware device performs driver initialization, the first process requesting for access to the hardware device needs to first establish a mutex based on a thread mutually exclusive access and a shared image file. Once the mutex based on the mutually exclusive access and the shared image file are established, a subsequent process only needs to obtain the established mutex and shared image file when requesting for access to the hardware device.

The shared process image file is a shared image file of the driver under the user mode, is for recording a register and/or an I/O status data, and is data shared by all processes.

The first determination module 702 includes a first determination unit and a mutex unit.

The first determination unit determines whether a value of a mutex counter of the process requiring access to the hardware device is greater than or equal to 1.

When the value of the mutex counter is greater than or equal to 1, the mutex unit indicates that the process requiring access to the hardware device has obtained the mutex of the hardware device. When the value of the mutex counter is smaller than 1, the mutex unit indicates that the process requiring access to the hardware device has not yet obtained the mutex.

The hardware control apparatus further includes a third determination module and a first execution module.

When the process requiring access to the hardware device has obtained the mutex, the third determination module determines whether an identification of a thread requiring access to the hardware device and an identification of a thread having obtained the mutex are the same.

When the identification of the thread requiring access to the hardware device and the identification of the thread having obtained the mutex are the same, the first execution module adds the value of the mutex counter by 1. When the identification of the thread requiring access to the hardware device and the identification of the thread having obtained the mutex are different, the first execution module prompts the thread requiring access to the hardware device to wait until the mutex is obtained.

The hardware control apparatus further includes a second execution module. When the identification of the thread requiring access to the hardware device and the identification of the thread having obtained the mutex are the same, the second execution module prompts the process requiring access to the hardware device to continue utilizing the hardware device.

The switch and access module 704 reads a register and/or an I/O status data from the stored process image file of the hardware device, and writes the read register and/or I/O status data to the hardware device to restore the hardware device to a configuration of the process requiring access to the hardware device.

The process image file is a process image file of the driver under the user mode, is for recording the register and/or the I/O status data, and is data exclusive to a corresponding process.

The hardware control apparatus further includes a fourth determination module and a third execution module.

When the process requiring access to the hardware device finishes accessing the hardware device, the fourth determination module determines whether the value of the mutex counter of the process requiring access to the hardware device is smaller than 1.

When the value of the mutex counter is smaller than 1, the third execution module releases the mutex, and exits an in-use status of the hardware device. In contrast, when the value of the mutex counter is greater than or equal to 1, the third execution module subtracts the value of the mutex counter by 1.

The hardware control apparatus further includes a resource exclusivity module, which includes a hardware exclusivity unit and a hardware exit unit.

The hardware exclusivity unit determines whether the request is a request for a resource exclusive mode. When it is determined that the request is the request for the resource exclusive mode, a start design development API under the resource exclusive mode obtains the mutex of the hardware device, and prompts the process requiring access to the hardware device to continue utilizing the hardware device until the process requiring access to the hardware device completes all operations.

Once the process requiring access to the hardware device completes all the operations, the hardware exit unit releases the mutex and exits the in-use status of the hardware device.

The hardware control apparatus further includes a program process termination function module, which recycles all information of the process requiring access to the hardware device and restores the status of the hardware device. The program process termination function module includes a second determination unit, a hardware release unit, a third determination unit, a mutex release unit, and an exit unit.

The second determination unit determines whether the process requiring access to the hardware device is utilizing the hardware device.

When the process requiring access to the hardware device is utilizing the hardware device, the hardware release unit releases the hardware device.

When the process requiring access to the hardware device is not utilizing the hardware device, the third determination unit determines whether the value of the mutex counter is greater than or equal to 1.

When the value of the mutex counter is greater than or equal to 1, the mutex release unit releases the mutex, resets the value of the mutex counter to 0, and exits the process requiring access to the hardware device.

In the present disclosure, random access to a hardware device under a user mode can be implemented through obtaining the mutex and performing the context switch. That is, after the current process requiring access to the hardware device obtains the mutex, it is determined whether the identification of the current process requiring access to the hardware device and the identification of the previous process accessed the hardware device are the same to determine whether to perform the context switch on the two processes, thereby facilitating the access to hardware device in a multitasking environment. With the above approach, when accessing a complicated hardware device, the driver performance under a user mode can be significantly enhanced to at the same time implement secured random access to the hardware device in a multitasking environment.

Further, since the driver is provided under a user mode in the disclosure, the GPL contamination can be avoided so that a source code can stay undisclosed, so that solution providers can develop unique applications based on the source codes that are not open to the public. Moreover, system performance in a multitasking environment is significantly enhanced to considerably reduce system loadings brought by frequent accesses under a kernel mode.

Further, the drivers adopts a method of categorized registers and reading most register values from the image files to implement the context switch, so as to prevent a long waiting period for reading register values from certain hardware device sequences to further promote the driver performance.

It is discovered through actual tests on a graphic processing display platform that, the application according to an embodiment of the disclosure enhances the driver performance by approximately 30% under a kernel mode compared to the prior art. As each task is protected by the context switch protection mechanism, each application feels as if it has exclusive access to the hardware device and performs tasks according to its own requirements, thereby ideally implementing hardware sharing among multiple processes.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A hardware control method for multitasking drivers under a user mode, comprising:
    performing driver initialization for a current process under the user mode, comprising:
        establishing a process image file to store register values exclusive to said current process for a hardware device; and
        establishing a shared image file to store hardware device register values shared among processes;
    receiving a request for access to the hardware device from the current process under the user mode, wherein the request comprises a current identifier corresponding to the current process;
    determining whether the current process has obtained a mutual exclusion (mutex) of the hardware device;
    when the current process has obtained the mutex, determining whether the current identifier and a prior identifier corresponding to a prior process that previously accessed the hardware device are the same; and when the current identifier and the prior identifier are different, performing a context switch to the current process from the prior process to allow the current process to access the hardware device, comprising:
        reading said register values exclusive to said current process from said process image file; and
        writing said register values exclusive to said current process to said process image file;
    when the current process has obtained the mutex, determining whether an identifier of a first thread corresponding to the current process and an identifier of a second thread corresponding to the prior process having previously obtained the mutex are the same;
    when the identifier of the first thread and the identifier of the second thread are the same, incrementing a mutex counter by 1, and accessing the hardware device by the first thread; and
    when the identifier of the first thread and the identifier of the second thread are different, waiting until the mutex is obtained by the first thread.

2. The hardware control method according to claim 1, further comprising:
    reading register data or I/O status data corresponding to the current process from said process image file, and writing said register data or I/O status data to the hardware device to restore the hardware device to a configuration corresponding to the current process.

3. The hardware control method according to claim 1, wherein the process image file is a program image file of a driver under the user mode, is for recording the register or the I/O status data, and is data exclusive to a corresponding process.

4. The hardware control method according to claim 1, wherein the current process continues utilizing the hardware device when the current identifier and the prior identifier are the same.

5. The hardware control method according to claim 1, further comprising:
    determining whether a mutex counter is greater than or equal to 1;
    wherein, when the mutex counter is greater than or equal to 1, it indicates that the current process has obtained the mutex; when the mutex counter is smaller than 1, it indicates that the current process has not yet obtained the mutex.

6. The hardware control method according to claim 1, further comprising:
determining whether the mutex counter is smaller than 1 after the current process finishes accessing the hardware device; and
releasing the mutex and exiting an in-use status of the hardware device when the mutex counter is smaller than 1, and reducing the mutex counter by 1 when the mutex counter is greater than or equal to 1.

7. The hardware control method according to claim 1, wherein the current process utilizes the hardware device via at least one application programming interface (API).

8. The hardware control method according to claim 7, further comprising:
determining whether the request is a request for a resource exclusive mode; when the request is the request for the resource exclusive mode, obtaining the mutex of the hardware device by a start API under the resource exclusive mode, and the current process continuing utilizing the hardware device until all operations of the current process are completed; and
releasing the mutex and exiting the in-use status of the hardware device when all the operations of the current process are completed.

9. The hardware control method according to claim 1, further comprising:
registering a program process termination function of the current process, wherein the program process termination function recycles all information of the current process and restores a status of the hardware device.

10. The hardware control method according to claim 9, further comprising:
determining whether the current process is utilizing the hardware device;
discontinuing use of the hardware device if the current process is utilizing the hardware device;
determining whether a mutex counter of the current process is greater than or equal to 1 when the current process is not utilizing the hardware device;
releasing the mutex, resetting the mutex counter to 0, and exiting the current process when the mutex counter is greater than or equal to 1.

11. The hardware control method according to claim 1, further comprising:
determining whether the current process is the first process to request access to the hardware device;
when the current process is the first process to request access to the hardware device, using the current process to establish the mutex according to a thread mutually exclusive access and a shared image file; and
when the current process is not the first process to request access to the hardware device, using the current process to obtain the established mutex and the shared image file.

12. The hardware control method according to claim 11, wherein the shared image file is an image file of a driver under the user mode, is for recording a register or an I/O status data, and is data shared by all processes.

13. A non-transitory computer-readable storage medium, storing software readable and executable by a processor for multitasking drivers under a user mode, said software comprising:
a driver initialization unit, prompting a current process under the user mode to establish a mutex based on a mutually exclusive access of a first thread corresponding to the current process and a shared image file when the current process requests access to a hardware device;
a receiving module, receiving a request for access to a hardware device from a current process under the user mode, wherein the request comprises a current identifier corresponding to the current process;
a first determination module, determining whether the current process has obtained a mutex of the hardware device;
a second determination module, determining whether the current identifier and a prior identifier corresponding to a prior process that previously accessed the hardware device are the same when the current process has obtained the mutex; and
a switch and access module, performing a context switch on the current process and the prior process to allow the current process to access the hardware device when the current identifier and the prior identifier are different;
a third determination module, determining whether an identifier of the first thread and an identifier of a second thread corresponding to the prior process having previously obtained the mutex are the same when the current process has obtained the mutex;
a first execution module, incrementing a mutex counter by 1 to allow the first thread to continue accessing the hardware device when the identifier of the first thread and the identifier of the second thread are the same; and prompting the first thread to wait until the mutex is obtained when the identifier of the first thread and the identifier of the second thread are different.

14. The non-transitory computer-readable storage medium according to claim 13, wherein the switch and access module reads register data or I/O status data corresponding to the current process from said process image file, and writes said register data or I/O status data to the hardware device to restore the hardware device to a configuration corresponding to the current process.

15. The non-transitory computer-readable storage medium according to claim 14, wherein the process image file is a program image file of a driver under the user mode, is for recording the register or the I/O status data, and is data exclusive to a corresponding process.

16. The non-transitory computer-readable storage medium according to claim 13, wherein said software further comprises:
a second execution module, prompting the current process to continue accessing the hardware device when the current identifier and the prior identifier are the same.

17. The non-transitory computer-readable storage medium according to claim 15, wherein the first determination module comprises:
a first determination unit, determining whether a mutex counter is greater than or equal to 1; and
a mutex unit, indicating that the current process has obtained the mutex when the mutex counter is greater than or equal to 1, and indicating that the current process has not yet obtained the mutex when the mutex counter is smaller than 1.

18. The non-transitory computer-readable storage medium according to claim 13, wherein said software further comprise:
a fourth determination module, determining whether a mutex counter is small than 1 after the current process finishes accessing the hardware device; and
a third execution unit, releasing the mutex and exiting an in-use status of the hardware device when the mutex counter is smaller than 1, and reducing the mutex counter by 1 when the mutex counter is greater than or equal to 1.

19. The non-transitory computer-readable storage medium according to claim 13, wherein the current process utilizes the hardware device via at least one API.

20. The non-transitory computer-readable storage medium according to claim 19, further comprises:
- a resource exclusivity module, comprising:
  - a hardware exclusivity unit, determining whether the request is a request for a resource exclusive mode; wherein a start API under the resource exclusive mode obtains the mutex of the hardware device when the request is the request for the resource exclusive mode, and the current process continues accessing the hardware device until all operations of the current process are completed; and
- a hardware exit unit, releasing the mutex and exiting an in-use status of the hardware device when all the operations of the current process are completed.

21. The non-transitory computer-readable storage medium according to claim 13, wherein said software further comprises:
- a program process termination function module, recycling all information of the current process and restoring a status of the hardware device, the program process termination function module comprising:
  - a second determination unit, determining whether the current process is utilizing the hardware device;
  - a hardware release unit, discontinuing use of the hardware device if the current process is utilizing the hardware device;
  - a third determination unit, determining whether a mutex counter of the current process is greater than or equal to 1 when the current process is not utilizing the hardware device; and
  - a mutex release unit, releasing the mutex, resetting the mutex counter to 0, and exiting the current process when the mutex counter is greater than or equal to 1.

22. The non-transitory computer-readable storage medium according to claim 13, wherein said software further comprises:
- a fourth determination unit, determining whether the current process is the first process to request access to the hardware device, wherein said driver initialization unit prompts said current process to establish said mutex based on a thread mutually exclusive access and said shared image file when the current process is the first process to request access to the hardware device.

23. The non-transitory computer-readable storage medium according to claim 22, wherein the shared image file is a shared image file of a driver under the user mode, is for recording a register or an I/O status data, and is data shared by all processes.

* * * * *